United States Patent [19]
Ono

[11] Patent Number: 4,939,366
[45] Date of Patent: Jul. 3, 1990

[54] RADIATION IMAGE RECORDING AND READ-OUT APPARATUS, AND RADIATION IMAGE RECORDING, READ-OUT AND REPRODUCING APPARATUS

[75] Inventor: Shuji Ono, Kanagawa, Japan

[73] Assignee: Fuji Photo Film Co., Ltd., Kanagawa, Japan

[21] Appl. No.: 210,883

[22] Filed: Jun. 23, 1988

[30] Foreign Application Priority Data

Jun. 25, 1987 [JP] Japan ................................ 62-158609
Jul. 13, 1987 [JP] Japan ................................ 62-174551

[51] Int. Cl.$^5$ .............................................. G03G 5/16
[52] U.S. Cl. ................................................. 250/327.2
[58] Field of Search .................. 250/327.20 J, 327.2 K

[56] References Cited

U.S. PATENT DOCUMENTS 4,258,264  3/1981  Kotera et al. .................... 250/327.2
4,400,619  8/1983  Kotera et al. ................. 250/327.2 H
4,543,479  9/1985  Kato ................................. 250/327.2
4,739,166  4/1988  Yoshimura et al. .......... 250/484.1 B
4,778,995 10/1988  Kulpinski et al. .................... 250/368

FOREIGN PATENT DOCUMENTS 0209119  1/1987  European Pat. Off. ..... 250/327.2 F
0011395  2/1981  Japan ................................ 250/327.2
56-11395  2/1981  Japan ................................ 250/327.2

Primary Examiner—Constantine Hannaher
Assistant Examiner—J. Eisenberg
Attorney, Agent, or Firm—Sughrue, Mion, Zinn, Macpeak & Seas

[57] ABSTRACT

A radiation image recording and read-out apparatus comprises a stimulable phosphor belt section constituted by an endless stimulable phosphor belt and a pair of roller sections for supporting the stimulable phosphor belt therearound so that the stimulable phosphor belt forms two surfaces, an image recording section facing one surface of the stimulable phosphor belt, and an image read-out section facing the other surface of the stimulable phosphor belt. At the time of image read-out, the stimulable phosphor belt section is moved at a speed equal to the movement speed of the stimulable phosphor belt reversely to the movement direction of the one surface of the stimulable phosphor belt. A radiation image recording, read-out, and reproducing apparatus also comprises a recording light scanning device moveable integrally with the stimulable phosphor belt section and the image read-out section.

10 Claims, 7 Drawing Sheets

RADIATION IMAGE RECORDING AND READ-OUT APPARATUS, AND RADIATION IMAGE RECORDING, READ-OUT AND REPRODUCING APPARATUS

BACKGROUND OF THE INVENTION

This invention relates to a radiation image recording and read-out apparatus for recording a radiation image on a stimulable phosphor, exposing the stimulable phosphor to stimulating rays which cause the stimulable phosphor to emit light in proportion to the stored radiation energy, detecting the emitted light to read out the radiation image, and converting the emitted light into electric signals. This invention particularly relates to a radiation image recording and read-out apparatus wherein recording and read-out of the radiation image are carried out simultaneously. This invention also relates to a radiation image recording, read-out, and reproducing apparatus for reproducing the read-out radiation image on a recording sheet, wherein recording, read-out, and reproduction of the radiation image are carried out simultaneously.

When certain kinds of phosphors are exposed to a radiation such as X-rays, α-rays, β-rays, γ-rays, cathode rays, or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a recording material provided with a layer of the stimulable phosphor is exposed first to a radiation passing through an object such as the human body to have a radiation image of the object stored thereon, and then is scanned two-dimensionally by stimulating rays such as a laser beam which cause the recording material to emit light in proportion to the stored radiation energy. The light emitted by the recording material upon stimulation thereof is detected photoelectrically and converted to electric image signals by a photodetector, and the radiation image of the object is reproduced as a visible image by use of the image signals on a recording medium such as a photographic film, a display device such as a cathode ray tube (CRT), or the like.

The radiation image recording and reproducing system using a recording material provided with a stimulable phosphor is advantageous over conventional radiography using a silver halide photographic material in that the image can be recorded over a very wide range (latitude) of radiation exposure. More specifically, since the amount of light emitted upon stimulation after the radiation energy is stored on the stimulable phosphor varies over a wide range in proportion to the amount of the stored energy, it is possible to obtain an image having a desirable density regardless of the amount of exposure of the recording material provided with the stimulable phosphor to the radiation, by reading out the emitted light with an appropriate read-out gain and converting it into electric signals to reproduce a visible image on a recording medium or a display device.

In the aforesaid radiation image recording and reproducing system, the recording material provided with the stimulable phosphor is used to store temporarily the radiation image in order to reproduce the final visible image therefrom on a final recording medium. For economical reasons, therefore, it is desirable that the recording material provided with the stimulable phosphor be used repeatedly.

Accordingly, the applicant proposed in, for example, Japanese Unexamined Patent Publication No. 58(1983)-200269, a radiation image recording and read-out apparatus which enables efficient circulation and reuse of the stimulable phosphor.

The proposed radiation image recording and read-out apparatus comprises, built in a single apparatus:

(a) a supporting material, (b) at least one recording material fixed on the supporting material and comprised of a stimulable phosphor layer capable of storing a radiation image, (c) an image recording section for exposing the recording material to a radiation passing through an object to have a radiation image of the object stored on the recording material, (d) an image read-out section provided with a stimulating ray scanning unit for scanning the recording material carrying the radiation image stored thereon by stimulating rays, and a photoelectric read-out unit for obtaining electric image signals by reading out light emitted by the recording material scanned and stimulated with the stimulating rays, (e) a unit for circulating the recording material on the supporting material with respect to the image read-out section for enabling reuse of the recording material by moving repeated the supporting material and the image read-out section with respect to each other, and (f) an erasing section for eliminating the radiation energy remaining on the recording material prior to image recording on the recording material after the radiation image is read out therefrom at the image read-out section, whereby the recording material is circulated and reused efficiently.

In the proposed radiation image recording and read-out apparatus, it is very advantageous that a material comprising an endless supporting belt and a plurality of stimulable phosphor layers overlaid on the endless supporting belt be used as the recording material. In this case, the recording material can be applied around rollers or the like and conveyed and circulated sequentially through the image recording section, the image read-out section, and the erasing section. An example of such a configuration is shown in FIG. 5.

With reference to FIG. 5, three stimulable phosphor sheets 302, 302, 302 are fixed on and endless conveyor 301. The conveyor 301 is provided around rollers 303 and 304, and moved in the direction as indicated by the arrow by rotations of the rollers 303 and 304. Around the conveyor 301, an image recording section 310, an image read-out section 320 and an erasing section 330 are disposed sequentially in the direction of conveyance by the conveyor 301.

The image recording section 310 is provided with a radiation source 311 which may be an X-ray source or the like, and stores a radiation image of an object 312 on the stimulable phosphor sheet 302 facing the radiation source 311 via the object 312. The stimulable phosphor sheet 302 carrying the radiation image thus stored thereon is sent to the image read-out section 320. The image read-out section 320 is provided with a stimulating ray source 321 for emitting stimulating rays 321A such as a laser beam, a light deflector 322 constituted by a galvanometer mirror or the like for deflecting the stimulating rays 321A emitted by the stimulating ray source 321 in the width direction of the conveyor 301, and a photodetector 323 for reading out the light 325 emitted by the stimulable phosphor sheet 302 upon stimulation thereof by the stimulating rays 321A. The photodetector 323 may be constituted by a head-on type photomultiplier, a photoelectric amplification channel plate, or the like. The photodetector 323 photoelectrically detects the light 325 emitted by the stimulable phosphor sheet 302 upon stimulation thereof and guided by a light guide member 324. When the image-recorded stimulable phosphor sheet 302 has been sent to the image read-out section 320, the stimulable phosphor sheet 302 or the scanning system for the stimulating rays 321A and the system for detecting the light 325 emitted by the stimulable phosphor sheet 302 are moved normal to the direction of scanning of the stimulating rays 321A, so that the overall surface of the stimulable phosphor sheet 302 is exposed to the stimulating rays 321A, and image read-out is carried out over the overall surface of the stimulable phosphor sheet 302. After the image read-out from the stimulable phosphor sheet 302 is finished, the stimulable phosphor sheet 302 is sent to the erasing section 330 provided with an erasing light source 331. The erasing light source 331 irradiates light having a wavelength within the stimulation wavelength range of the stimulable phosphor sheet 302 onto the stimulable phosphor sheet 302 to cause it to release the radiation energy remaining thereon. The erasing light source 331 may be constituted by, e.g., a tungsten-filament lamp, a halogen lamp, an infrared lamp, or a laser source as disclosed in U.S. Pat. No. 4,400,619. The stimulable phosphor sheet 302 erased at the erasing section 330 is sent again to the image recording section 310. In the course of movement of the stimulable phosphor sheet 302 to the erasing section 330, the stimulable phosphor sheet 302 is cleaned by a cleaning roller 305, and dust is removed from the sheet surface.

However, with the radiation image recording and read-out apparatus as shown in FIG. 5, the conveyor 301 must be stopped at the time the radiation image is to be recorded at the image recording section 310, and must be operated at the time the image read-out is to be carried out at the image read-out section 320. Therefore, it is difficult to carry out the image recording and the image read-out simultaneously. Thus the image recording cannot be carried out as long as the image read-out from a stimulable phosphor sheet is being carried out at the image read-out section 320. A comparatively long time is required for the image read-out, and therefore the image recording cannot be carried out efficiently in the case where many radiation images are to be recorded sequentially.

SUMMARY OF THE INVENTION

The primary object of the present invention is to provide a radiation image recording and read-out apparatus wherein image recording is carried out simultaneously with image read-out.

Another object of the present invention is to provide a radiation image recording, read-out, and reproducing apparatus wherein image recording is carried out simultaneously with image read-out, and which is provided with image recording, image read-out, and image reproducing functions.

The present invention provides a radiation image recording and read-out apparatus comprising:

(i) a stimulable phosphor belt section constituted by a stimulable phosphor belt, which is composed of an endless belt provided with a stimulable phosphor layer, and a pair of roller sections for supporting the stimulable phosphor belt therearound so that the stimulable phosphor belt forms two surfaces, and for moving the stimulable phosphor belt therearound, (ii) an image recording section provided to face one surface of the stimulable phosphor belt for exposing the stimulable phosphor layer of the stimulable phosphor belt to radiation carrying an image to have a radiation image of an object stored on the stimulable phosphor layer, (iii) an image read-out section disposed to face the other surface of the stimulable phosphor belt and provided with a stimulating ray scanning unit for scanning the stimulable phosphor layer carrying the radiation image stored thereon by stimulating rays which cause the stimulable phosphor layer to emit light in proportion to the stored radiation energy, and a photoelectric read-out unit for obtaining electric image signals by reading out the light emitted by the stimulable phosphor layer scanned with the stimulating rays, (iv) an erasing section for releasing the radiation energy remaining on the stimulable phosphor layer prior to image recording on the stimulable phosphor layer after the radiation image has been read out therefrom at the image read-out section, and (v) a movement means for moving the stimulable phosphor belt section at the time of the image read-out at a speed approximately equal to the movement speed of the stimulable phosphor belt in a direction reverse to the direction of movement of the one surface of the stimulable phosphor belt.

The present invention also provides a radiation image recording, read-out, and reproducing apparatus comprising:

(i) a stimulable phosphor belt section constituted by a stimulable phosphor belt, which is composed of an endless belt provided with a stimulable phosphor layer, and a pair of roller sections for supporting said stimulable phosphor belt therearound so that the stimulable phosphor belt forms two surfaces, and for moving the stimulable phosphor belt therearound, (ii) an image recording section provided to face one surface of the stimulable phosphor belt for exposing the stimulable phosphor layer of the stimulable phosphor belt to radiation carrying an image to have a radiation image of an object stored on the stimulable phosphor layer, (iii) an image read-out section disposed to face the other surface of the stimulable phosphor belt and provided with a stimulating ray scanning unit for scanning the stimulable phosphor layer carrying the radiation image stored thereon by stimulating rays which cause the stimulable phosphor layer to emit light in proportion to the stored radiation energy, and a photoelectric read-out unit for obtaining electric image signals by reading out the light emitted by the stimulable phosphor layer scanned with the stimulating rays, (iv) a recording light scanning section for scanning a surface facing the other surface of the stimulable phosphor belt by recording light modulated in accordance with the electric image signals, (v) a movement unit for moving the stimulable phosphor belt section, the image read-out section and the recording light scanning section integrally with one another at the time of the image read-out at a speed approximately equal to the movement speed of the stimulable phosphor belt in a direction reverse to the direction of movement of the one surface of the stimulable phosphor belt, (vi) an erasing section for releasing the radiation energy remaining on the stimulable phosphor layer prior to image recording on the stimulable phosphor layer after the radiation image has been read out therefrom by the image read-out section, and (vii) a recording sheet holding section for holding a recording sheet at a position scanned by the recording light at the time the recording light scanning section is moved by the movement unit.

The stimulable phosphor layer may be formed over the overall surface of the stimulable phosphor belt 1. Alternatively, the stimulable phosphor layer may be formed only at necessary portions of the stimulable phosphor belt 1.

With the radiation image recording and read-out apparatus in accordance with the present invention, scanning of the stimulable phosphor belt in the sub-scanning direction at the image read-out section is performed by the movement of the stimulable phosphor belt effected by the roller sections and the movement of the stimulable phosphor belt section as a whole effected by the movement means. On the other hand, at the image recording section, the movement of the stimulable phosphor belt effected by the roller sections and the movement of the stimulable phosphor belt section as a whole effected by the movement unit are canceled with each other, and the stimulable phosphor belt is maintained apparently stationary at a predetermined position. Therefore, the image recording and the image read-out can be carried out simultaneously by rotating the rollers of the roller sections and operating the movement means.

Accordingly, with the radiation image recording and read-out apparatus in accordance with the present invention wherein the endless stimulable phosphor belt is used, the stimulable phosphor belt can be moved at the image read-out section and, at the same time, can be maintained apparently stationary at the image recording section by conveying the stimulable phosphor belt by the roller sections and moving the stimulable phosphor belt and the roller sections integrally with each other. Therefore, the image recording can be carried out while the image read-out is being carried out, and the recording of many radiation images can be carried out efficiently.

With the radiation image recording, read-out and reproducing apparatus in accordance with the present invention, the stimulable phosphor belt is moved by the roller sections in the sub-scanning direction with respect to the image read-out means. On the other hand, at the image recording section, the movement of the stimulable phosphor belt effected by the roller sections and the movement of the stimulable phosphor belt section as a whole effected by the movement unit are canceled with each other, and the stimulable phosphor belt apparently is maintained stationary at a predetermined position. Therefore, the image recording and the image read-out can be performed simultaneously by rotating the rollers of the roller sections and operating the movement means. Also, with the radiation image recording, read-out, and reproducing apparatus in accordance with the present invention wherein the image read-out section and the recording light scanning section are moved integrally with each other, the image read-out and the image reproduction can be performed simultaneously. In this manner, an image reproducing apparatus and an image recording and read-out apparatus can be formed integrally without the overall apparatus being made larger.

Accordingly, with the radiation image recording, read-out and reproducing apparatus in accordance with the present invention wherein the endless stimulable phosphor belt is used, the stimulable phosphor belt can be moved with respect to the image read-out section and, at the same time, can be maintained apparently stationary at the image recording section by conveying the stimulable phosphor belt by the roller sections and moving the stimulable phosphor belt and the roller sections integrally with each other. Therefore, the image recording can be performed while the image read-out is being performed, and the recording of many radiation images can be performed efficiently.

Also, with the radiation image recording, read-out and reproducing apparatus in accordance with the present invention wherein the recording light scanning unit is provided for movement together with the image read-out section and the recording sheet is disposed at the position of the scanning of the recording light, the image read-out and the image reproduction can be carried out simultaneously. In this manner, an image recording and read-out apparatus and an image reproducing apparatus can be formed integrally. Accordingly, with the radiation image recording, read-out, and reproducing apparatus in accordance with the present invention, the image recording, the image read-out and the image reproduction can be carried out simultaneously, processing can be carried out efficiently, and the system as a whole can be made compact.

DETAILED DESCRIPTION OF THE PREFERRED EMBODIMENTS

The present invention will be described hereinbelow in further detail with reference to the accompanying drawings.

Figure 1A:
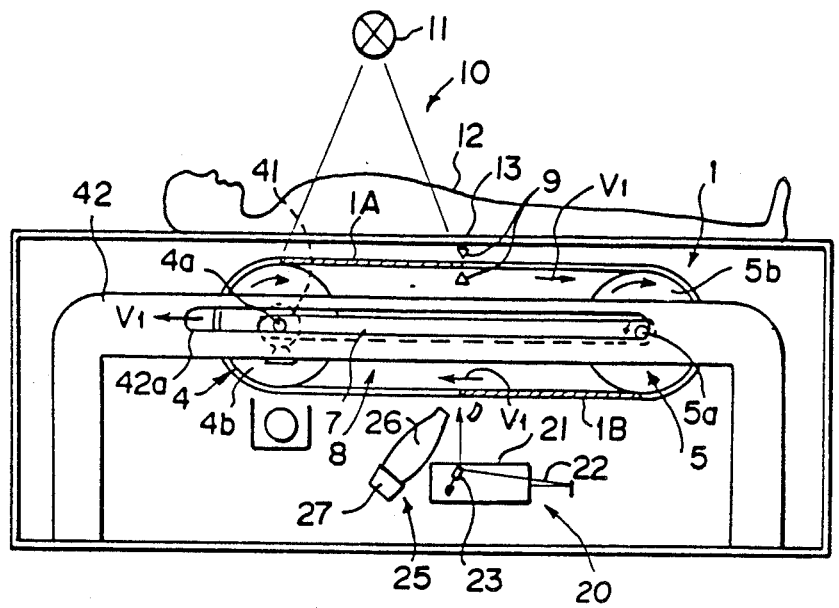
FIGS. 1A, 1B, and 1C are side views showing an embodiment of the radiation image recording and read-out apparatus in accordance with the present invention.

With reference to FIG. 1A, an endless stimulable phosphor belt 1 is provided with a stimulable phosphor layer on the surface only at portions indicated by hatching, i.e. at a stimulable phosphor portion 1A and a stimulable phosphor portion 1B. The stimulable phosphor belt 1 is applied around a first roller section 4 and a second roller section 5, and an upper surface and a lower surface parallel with each other are formed by the roller sections 4 and 5. Also, a shaft 4a and a roller 4b are coupled with each other via a one-way clutch at the first roller section 4, and a shaft 5a and a roller 5b are coupled with each other via a one-way clutch at the second roller section 5. The shafts 4a and 5a are connected with each other by a connection arm 7. The one-way clutches rotate the rollers 4b and 5b together with the shafts 4a and 5a when the shafts 4a and 5a are rotated clockwise, and make the rollers 4b and 5b free when the shafts 4a and 5a are rotated counter-clockwise. In this embodiment, a stimulable phosphor belt section 8 is constituted by the stimulable phosphor belt 1 and the roller sections 4 and 5.

The stimulable phosphor belt section 8 is moved horizontally by a unit comprising a motor 41 for rotating the shaft 4a clockwise and counter-clockwise, and a guide member 42 extending horizontally and provided with a groove 42a with which the shafts 4a and 5a are engaged. As the motor 41 is operated, the shafts 4a and 5a move along the groove 42a.

A radiation source 11 constituted by an X-ray source or the like is provided to face the upper surface of the stimulable phosphor belt 1. An image recording section 10 is constituted by the radiation source 11 and an image recording table 13 on which an object 12 is placed. At the time the image recording is to be carried out at the image recording section 10, the stimulable phosphor belt section 8 is disposed at the right end of the movement range thereof as shown in FIG. 1A, and the stimulable phosphor portion 1A on the upper surface side of the stimulable phosphor belt 1 is positioned to face the radiation source 11. The stimulable phosphor portion 1B on the lower surface side of the stimulable phosphor belt 1 has carried a radiation image stored thereon already.

An image read-out section 20 for reading out the radiation image stored on the stimulable phosphor portion of the stimulable phosphor belt 1 is provided to face the lower surface of the stimulable phosphor belt 1. The image read-out section 20 is provided with a stimulating ray scanning unit 24 for deflecting a laser beam 22, which is produced as stimulating rays by a laser beam source 21, by a light deflector 23 constituted by a galvanometer mirror or the like, so that the laser beam 22 scans at an angle normal to the drawing sheet in FIG. 1A, and a photoelectric read-out unit 25 comprising a light guide member 26 and a photo-multiplier 27 for photoelectrically detecting light emitted by the stimulable phosphor portion of the stimulable phosphor belt 1 in proportion to the stored radiation energy when the stimulable phosphor portion is scanned by the laser beam 22. In this embodiment, at the time one of the stimulable phosphor portions 1A or 1B is positioned at the image recording section 10, the left edge of the other of the stimulable phosphor portions 1A or 1B is present at the position of the laser beam 22. With this embodiment, the image recording at the image recording section 10 and the image read-out at the image read-out section 20 can be performed simultaneously. The operations of the embodiment shown in FIG. 1A at the time of the image recording and the image read-out will be described hereinbelow.

When the condition inside of the radiation image recording and read-out apparatus is as shown in FIG. 1A, the motor 41 rotates the shaft 4a counter-clockwise, and the shaft 5a is rotated counter-clockwise together with the shaft 4a. Also, the right edge of the stimulable phosphor portion 1A is held and fixed by holding unit 9 so that the absolute position of the stimulable phosphor portion 1A is maintained at the predetermined position. At the time the shafts 4a and 5a are rotated counter-clockwise, the rollers 4b and 5b are made to rotate freely by the one-way clutches. Therefore, as the edge of the stimulable phosphor portion 1A is fixed, the rollers 4b and 5b rotate clockwise when the shafts 4a and 5a are rotated counter-clockwise. As a result, even though the stimulable phosphor belt section 8 is moved leftward as a whole, the stimulable phosphor portion 1A is maintained at the position facing the radiation source 11 as shown in FIG. 1A. Accordingly, regardless of the movement of the stimulable phosphor belt section 8, an image of radiation passing through the object 12 can be stored on the stimulable phosphor portion 1A by activating the radiation source 11 at the image recording section 10. On the other hand, at the lower surface of the stimulable phosphor belt 1, the stimulable phosphor belt 1 is moved leftward at a speed equal to the sum of a speed v1 of the leftward movement of the stimulable phosphor belt section 8 as a whole, and a speed v1 of the movement of the stimulable phosphor belt 1 effected by the rotations of the rollers 4b and 5b, i.e. at a speed equal to 2v1. Therefore, at the image read-out section 20, the stimulable phosphor portion 1B is moved at the speed 2v1 in the sub-scanning direction. The laser beam 22 is scanned two-dimensionally on the stimulable phosphor portion 1B which is moved in the sub-scanning direction. As the stimulable phosphor portion 1B is scanned by the laser beam 22, the stimulable phosphor portion 1B emits light in proportion to the stored radiation energy. The emitted light is detected by the photomultiplier 27 via the light guide member 26, and electric image signals in accordance with the light emitted by the stimulable phosphor portion 1B are generated by the photomultiplier 27. In FIG. 1A, reference numeral 28 denotes a reflection mirror for efficiently reflecting the light, which is emitted by the stimulable phosphor portion 1B to the side opposite to the light guide member 26, toward the light input face of the light guide member 26.

Figure 1B:
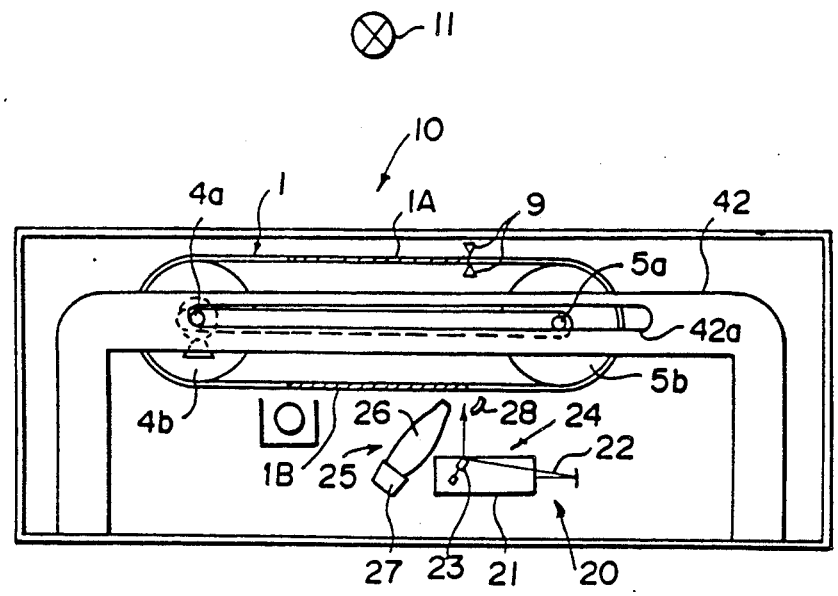

As shown in FIG. 1B, at the time the stimulable phosphor belt section 8 has been moved by a distance equal to one half of the length of the stimulable phosphor portion 1B, the scanning of the laser beam 22 over the overall surface of the stimulable phosphor portion 1B is completed. Also, a comparatively long time is required for the image read-out at the image read-out section 20, and therefore the image recording on the stimulable phosphor portion 1A at the image recording section 10 is finished generally before the image read-out from the stimulable phosphor portion 1B is finished. When the image recording on the stimulable phosphor portion 1A and the image read-out from the stimulable phosphor portion 1B are finished, the stimulable phosphor belt section 8 is returned to the right end of its movement range, and the stimulable phosphor belt 1 is moved so that the stimulable phosphor portion 1A is disposed at the read-out start position and the stimulable phosphor portion 1B is disposed at the image recording section 10.

Figure 1C:
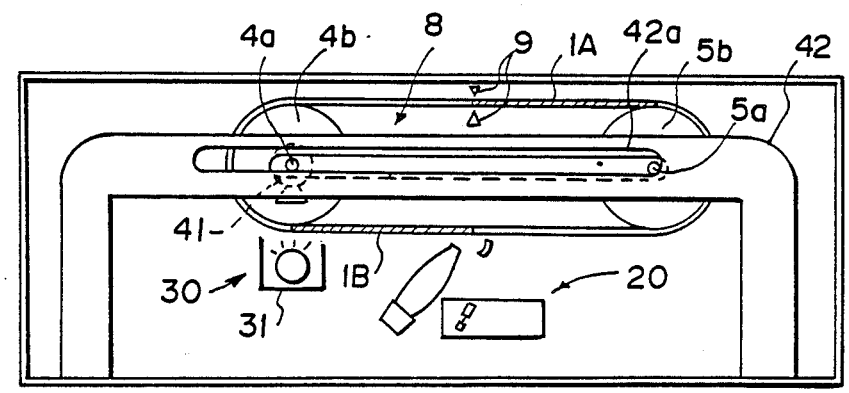

Specifically, the shaft 4a is rotated clockwise by the motor 41, and the stimulable phosphor belt section 8 is moved rightward from the position shown in FIG. 1B. Prior to this step, the holding unit 9 release the holding of the stimulable phosphor belt 1. Also, in this case, the rollers 4b and 5b rotate integrally with the shafts 4a and 5a. After the stimulable phosphor belt section 8 is moved to the right end of its movement range, the condition of the stimulable phosphor belt section 8 becomes as shown in FIG. 1C. In this condition, though the stimulable phosphor belt section 8 as a whole is present at the right end of its movement range, it is necessary for the stimulable phosphor portion 1A and the stimulable phosphor portion 1B to be further moved by the rotations of the rollers 4b and 5b. Therefore, the motor 41 continues to rotate the shaft 4a clockwise, the shaft 5b slips in contact with the side edge of the groove 42a, and the rollers 4b and 5b continue to rotate clockwise. In this manner, the stimulable phosphor portion 1B is moved to the position at which the stimulable phosphor portion 1A was disposed as shown in FIG. 1A, and the stimulable phosphor portion 1A is moved to the position at which the stimulable phosphor portion 1B was disposed as shown in FIG. 1A. Also, an erasing section 30 provided with an erasing light source 31 is provided to face the lower surface of the stimulable phosphor belt 1 on the left side of the image read-out section 20. Exactly after the stimulable phosphor belt section 8 has been returned to the condition shown in FIG. 1C, the erasing light source 31 is activated to irradiate the erasing light to the stimulable phosphor portion 1B conveyed leftward. The erasing light has a wavelength within the stimulation wavelength range of the stimulable phosphor layers of the stimulable phosphor portion 1A and the stimulable phosphor portion 1B. As the stimulable phosphor portion 1B is moved by the rollers 4b and 5b and exposed to the erasing light, the radiation energy remaining on the stimulable phosphor portion 1B after the image read-out from the stimulable phosphor portion 1B has been performed is released from the stimulable phosphor portion 1B. The stimulable phosphor portion 1B erased at the erasing section 30 is conveyed to the image recording section 10 and reused for the image recording.

With this embodiment wherein the stimulable phosphor belt section 8 as a whole is moved and, at the same time, the endless stimulable phosphor belt 1 is moved, one stimulable phosphor portion can be maintained apparently stationary at the image recording section 10, and the other stimulable phosphor portion can be moved in the sub-scanning direction at the image read-out section 20. Therefore, the image read-out and the image recording can be performed simultaneously. Accordingly, the image recording can be performed while the image read-out is being carried out, and recording of many radiation images can be performed efficiently.

Figure 2:
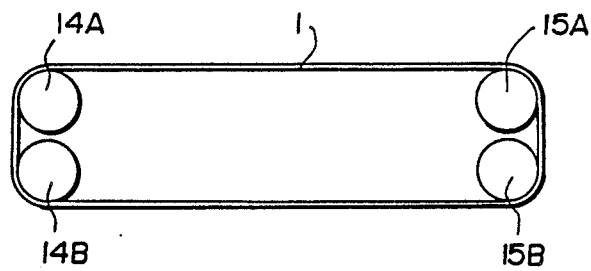
FIG. 2 is a schematic view showing a stimulable phosphor belt section in another embodiment of the radiation image recording and read-out apparatus in accordance with the present invention.
Figure 5:
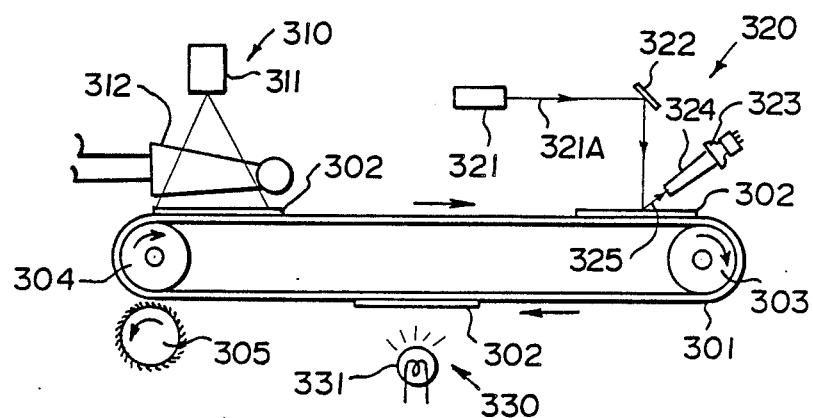
FIG. 5 is a side view showing the conventional radiation image recording and read-out apparatus.

Instead of providing the stimulable phosphor layer partially on the stimulable phosphor belt 1, the stimulable phosphor layer may be formed over the overall surface of the stimulable phosphor belt 1. Each of the roller sections 4 and 5 may be composed of a plurality of rollers. For example, as shown in FIG. 2, one roller section may be composed of rollers 14A and 14B, and the other roller section may be composed of rollers 15A and 15B. Also, instead of using a single motor for moving the stimulable phosphor belt section 8 and for moving the stimulable phosphor belt 1, the movement of the stimulable phosphor belt section 8 and the movement of the stimulable phosphor belt 1 may be controlled by independent unit. In this case, the holding means 9 need not be provided. Moreover, the layout and the configurations of the elements disposed around the stimulable phosphor belt section 8 are not limited to those employed in the aforesaid embodiment. For example, as disclosed in Japanese Unexamined Patent Publication No. 62(1987)-16666, detection of the light emitted by the stimulable phosphor layer may be performed by employing a long photomultiplier extending in the main scanning direction as the photoelectric read-out unit 25 at the image read-out section 20. With the long photomultiplier, the apparatus as a whole can be made smaller.

Figure 3A:
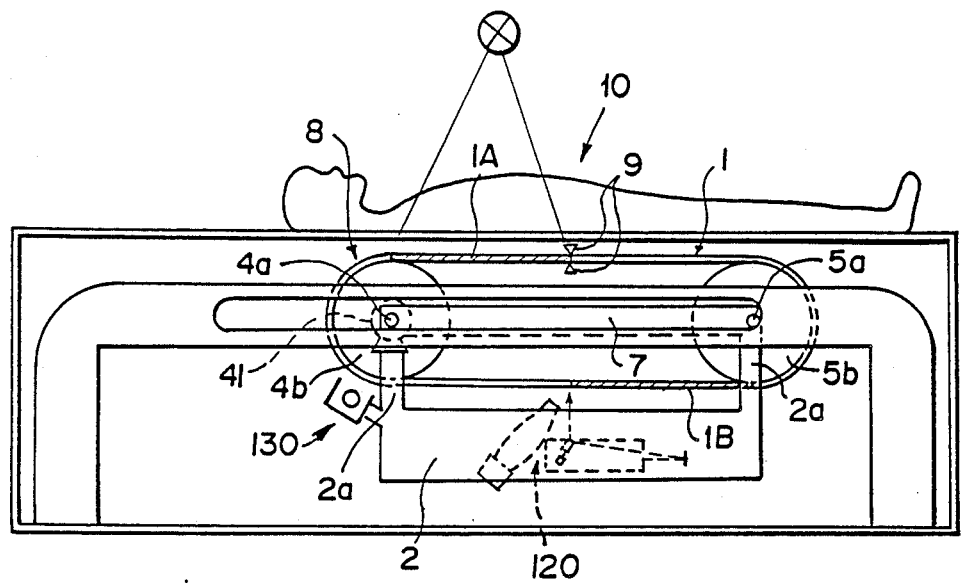
FIGS. 3A, 3B, and 3C are side views showing a further embodiment of the radiation image recording and read-out apparatus in accordance with the present invention.
Figure 3B:
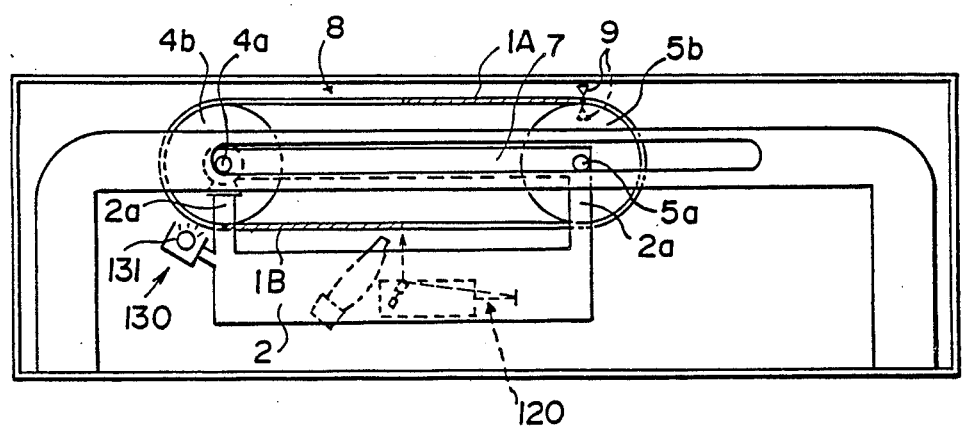
Figure 3C:
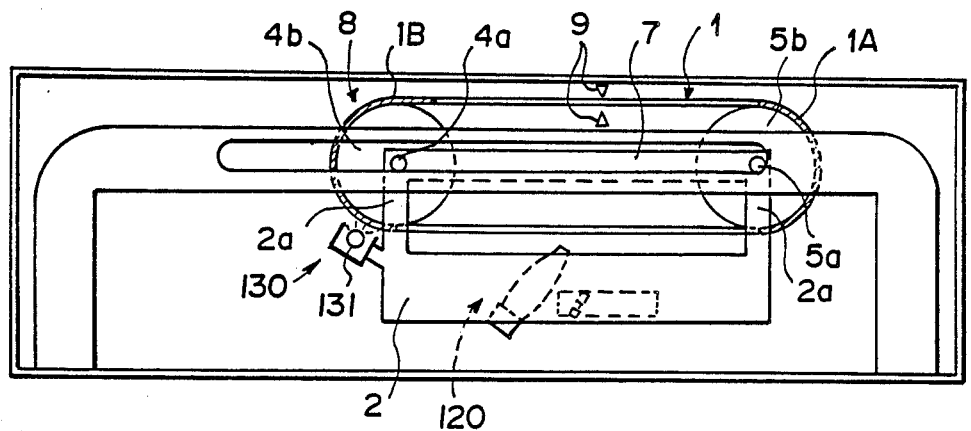

Also, the image read-out section 20 need not necessarily be fixed to face the stimulable phosphor belt section 8, and may be provided for movement integrally with the stimulable phosphor belt section 8. An embodiment of the radiation image recording and read-out apparatus in accordance with the present invention wherein the image read-out section is moveable will be described below with reference to FIGS. 3A, 3B, and 3C. In FIGS. 3A, 3B and 3C, similar elements are numbered with the same reference numerals with respect to FIGS. 1A, 1B, and 1C.

With reference to FIG. 3A, an image read-out section 120 is housed in a case 2 at a position facing the lower surface of the stimulable phosphor belt 1. The case 2 is joined with the connection arm 7 by supporting arms 2a, 2a, and the image read-out section 120 housed in the case 2 is moveable integrally with the stimulable phosphor belt section 8. The image read-out from the stimulable phosphor portion 1B is performed by the movement of the stimulable phosphor belt section 8 from the scanning start position shown in FIG. 3A to the position shown in FIG. 3B. In this embodiment, when the speed of conveyance of the stimulable phosphor belt section 8 by the rotations of the shafts 4a and 5a is v1, the stimulable phosphor portion 1B is moved leftward at a speed 2v1. At this time, the image read-out section 120 is moved leftward at the speed v1 together with the stimulable phosphor belt section 8, and therefore the sub-scanning speed of the stimulable phosphor portion 1B is equal to v1. Therefore, the distance over which the stimulable phosphor belt section 8 moves until the image read-out is completed is equal to the length of the stimulable phosphor portion 1B.

As shown in FIG. 3B, when the image read-out from the stimulable phosphor portion 1B is finished, an erasing light source 131 at an erasing section 130 provided on the case 2 is activated, and the shafts 4a and 5a are rotated clockwise to move the stimulable phosphor belt section 8 and the case 2 rightward. After the stimulable phosphor belt section 8 has been returned to the right end of its movement range as shown in FIG. 3C, the shafts 4a and 5a continue to be rotated clockwise, and the stimulable phosphor portion 1B is passed over the erasing section 130 and moved to the position at which the stimulable phosphor portion 1A was present as shown in FIG. 3A. In the embodiment wherein the stimulable phosphor belt section 8 and the image read-out section 120 are moved together, the two surfaces which the stimulable phosphor belt 1 forms need not necessarily be parallel to each other.

Figure 4A:
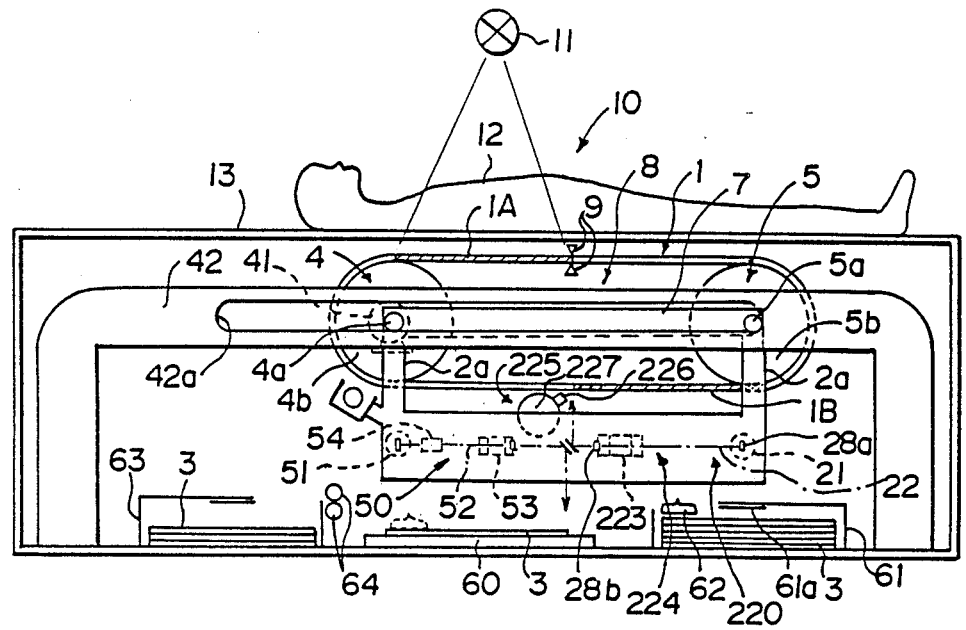
FIGS. 4A, 4B, and 4C are side views showing an embodiment of the radiation image recording, read-out and reproducing apparatus in accordance with the present invention.
Figure 4B:
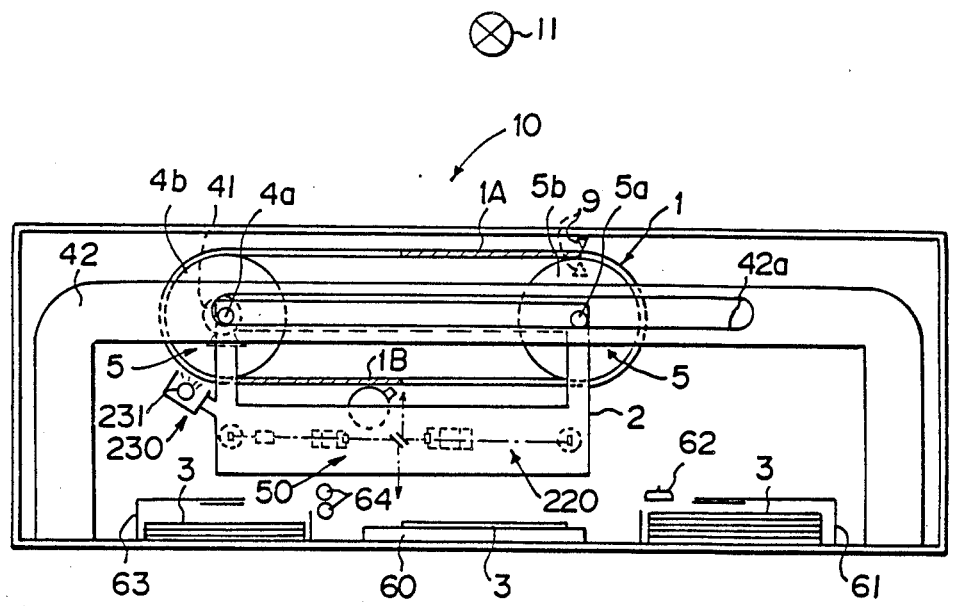
Figure 4C:
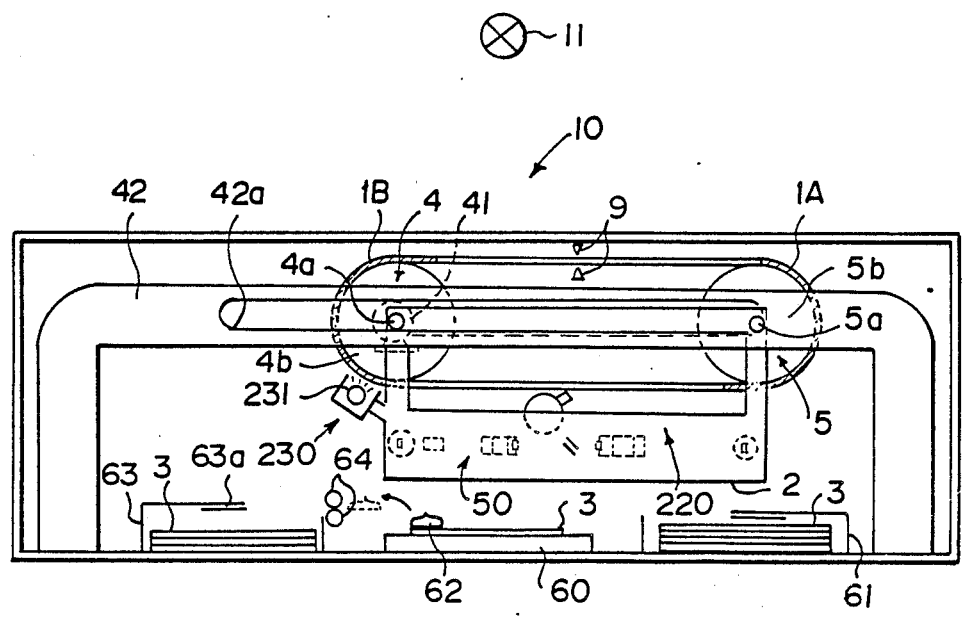

An embodiment of the radiation image recording, read-out, and reproducing apparatus in accordance with the present invention will be described hereinbelow with reference to FIGS. 4A, 4B, and 4C. In FIGS. 4A, 4B and 4C, similar elements are numbered with the same reference numerals with respect to FIGS. 1A, 1B, and 1C.

With reference to FIG. 4A, an image read-out section 220 for reading out the radiation image stored on the stimulable phosphor portion of the stimulable phosphor belt 1 is housed in the case 2 to face the lower surface of the stimulable phosphor belt 1. The case 2 is joined with the connection arm 7 by supporting arms 2a, and the image read-out section 220 housed in the case 2 is moveable integrally with the stimulable phosphor belt section 8. The image read-out section 220 is provided with a stimulating ray scanning unit 224 for reflecting the laser beam 22, which is produced as stimulating rays by the laser beam source 21 disposed at an angle normal to the drawing sheet in FIG. 4A, by mirrors 28a and 28b to change the optical path of the laser beam 22, and deflecting the laser beam 22 by a light deflector 223 constituted by a rotating polygon mirror or the like, so that the laser beam 22 scans at an angle normal to the drawing sheet in FIG. 4A, and a photoelectric read-out unit 225 for photoelectrically detecting light emitted by the stimulable phosphor portion of the stimulable phosphor belt 1 in proportion to the stored radiation energy when the stimulable phosphor portion is scanned by the laser beam 22. By way of example, the photoelectric read-out unit 225 is constituted by a long photomultiplier 227 extending in the main scanning direction of the laser beam 22 as disclosed in Japanese Unexamined Patent Publication No. 62(1987)-16666, and a small light guide member 226 closely contacting the light receiving face of the long photomultiplier 227. The long photomultiplier 227 is advantageous for making the photoelectric read-out unit 225 small. In this embodiment, at the time one of the stimulable phosphor portion 1A or the stimulable phosphor portion 1B is subjected to the image recording at the image recording section 10, the left edge of the other of the stimulable phosphor portion 1A or the stimulable phosphor portion 1B is present at the position of scanning of the laser beam 22.

Also, a recording light scanning section 50 for reproducing the radiation image which has been read by the image read-out section 220 is provided in the case 2. The recording light scanning unit 50 is constituted to modulate a laser beam, which is produced by a laser beam source 51, by a light modulator 54 in accordance with the electric image signals obtained by the photoelectric read-out unit 225, thereby to obtain recording light 52, and to deflect the recording light 52 by a light deflector 53 so that the recording light 52 scans a recording sheet 3 held below the recording light scanning section 50. With this embodiment, the image recording at the image recording section 10, the image read-out by the image read-out section 220, and the image reproduction by the recording light scanning section 50 can be carried out almost simultaneously. The operations of the embodiment shown in FIG. 4A at the time of the image recording, the image read-out, and the image reproduction will be described hereinbelow.

When the condition inside of the radiation image recording, read-out, and reproducing apparatus is as shown in FIG. 4A, the motor 41 rotates the shaft 4a counterclockwise, and the shaft 5a is rotated counterclockwise together with the shaft 4a. Also, the right edge of the stimulable phosphor portion 1A is held and fixed by holding unit 9 so that the absolute position of the stimulable phosphor portion 1A is maintained at the predetermined position. At the time the shafts 4a and 5a are rotated counter-clockwise, the rollers 4b and 5b are made by the one-way clutches to rotate freely. Therefore, as the edge of the stimulable phosphor portion 1A is fixed, the rollers 4b and 5b rotate clockwise when the shafts 4a and 5a are rotated counter-clockwise. As a result, even though the stimulable phosphor belt section 8 is moved leftward as a whole, the stimulable phosphor portion 1A is maintained at the position facing the radiation source 11 as shown in FIG. 4A. Accordingly, regardless of the movement of the stimulable phosphor belt section 8, an image of radiation passing through the object 12 can be stored on the stimulable phosphor portion 1A by activating the radiation source 11 at the image recording section 10. On the other hand, at the lower surface of the stimulable phosphor belt 1, the stimulable phosphor portion 1B is moved with respect to the image read-out section 220 in the sub-scanning direction, i.e. leftward in FIG. 4A, by the rotations of the rollers 4b and 5b. At this time, the stimulable phosphor portion 1B is moved leftward at a speed equal to the sum of a speed v1 of the leftward movement of the stimulable phosphor belt section 8 as a whole and a speed v1 of the leftward movement of the stimulable phosphor belt 1 effected by the rotations of the rollers 4b and 5b, i.e. at a speed equal to 2v1. In this case, the image read-out section 220 is also moved leftward at a speed v1 together with the stimulable phosphor belt section 8, and therefore the speed of the sub-scanning is equal to v1. The laser beam 22 is two-dimensionally scanned on the stimulable phosphor portion 1B which is thus moved in the sub-scanning direction. As the stimulable phosphor portion 1B is scanned by the laser beam 22, the stimulable phosphor portion 1B emits light in proportion to the stored radiation energy. The emitted light is detected by the photomultiplier 227 via the light guide member 226, and electric image signals in accordance with the light emitted by the stimulable phosphor portion 1B are generated by the photomultiplier 227.

Substantially at the same time as the image read-out, the radiation image thus read out is reproduced as a visible image on the recording sheet 3 by the recording light scanning section 50. Specifically, a sheet feed magazine 61 capable of housing therein a plurality of recording sheets 3 formed of a wet development photographic material is provided below the case 2. After a shutter 61a of the sheet feed magazine 61 is opened, a suction cup 62 sucks up the recording sheets 3, one by one out of the sheet feed magazine 61, and moves from the position indicated by the solid line to the position indicated by the broken line. In this manner, as shown in FIG. 4A, the recording sheet 3 is placed on a supporting base 60 as a recording sheet holding unit so that the right edge of the recording sheet 3 is disposed at the position of scanning of the recording light 52 at the time the stimulable phosphor belt section 8 and the case 2 is disposed at the read-out start position. After placing the recording sheet 3 on the supporting base 60, the suction cup 62 is returned to its position indicated by the solid line. After the recording sheet 3 is fixed on the supporting base 60, the recording light scanning section 50 is moved leftward as the case 2 is moved, and the recording light 52 scanned by the light deflector 53 in the main scanning direction normal to the drawing sheet in FIG. 4A is moved in the sub-scanning direction at a speed v1 with respect to the recording sheet 3. The recording light 52 has been modulated by the light modulator 54 of the recording light scanning section 50 in accordance with the electric image signals generated by the photomultiplier 227, and the radiation image which has been read out from the stimulable phosphor portion 1B by the image read-out means 220 is reproduced on the recording sheet 3 almost at the same time as the image read-out.

As shown in FIG. 4B, at the time the stimulable phosphor belt section 8 has been moved by a distance equal to the length of the stimulable phosphor portion 1B, the scanning of the laser beam 22 over the overall surface of the stimulable phosphor portion 1B is completed. Also, a comparatively long time is required for the image read-out at the image read-out section 220, and therefore the image recording on the stimulable phosphor portion 1A at the image recording section 10 is finished generally before the image read-out from the stimulable phosphor portion 1B is finished. Also, the lengths of the stimulable phosphor portion 1B and the recording sheet 3 in the sub-scanning direction are approximately equal to each other, and the image reproduction on the recording sheet 3 is finished almost simultaneously with the image read-out from the stimulable phosphor portion 1B. When the image recording on the stimulable phosphor portion 1A, the image read-out from the stimulable phosphor portion 1B and the image reproduction on the recording sheet 3 are finished, the stimulable phosphor belt section 8 is returned to the right end of its movement range, and the stimulable phosphor belt 1 is moved so that the stimulable phosphor portion 1A is disposed at the read-out start position and the stimulable phosphor portion 1B is disposed at the image recording section 10.

Specifically, the shaft 4a is rotated clockwise by the motor 41, and the stimulable phosphor belt section 8 is moved rightward from the position shown in FIG. 4B. Prior to this step, the holding unit 9 release the holding of the stimulable phosphor belt 1. Also, in this case, the rollers 4b and 5b rotate integrally with the shafts 4a and 5a. Also, an erasing section 230 provided with an erasing light source 231 is provided on the left side face of the case 2 for movement together with the case 2. Exactly after the image read-out from the stimulable phosphor portion 1B is finished, the erasing light source 231 is activated to produce the erasing light, and the stimulable phosphor portion 1B is passed over the erasing section 230 by the rollers 4b and 5b rotating clockwise. The erasing light produced by the erasing light source 231 has a wavelength within the stimulation wavelength range of the stimulable phosphor layers of the stimulable phosphor portion 1A and the stimulable phosphor portion 1B. As the stimulable phosphor portion 1B is moved by the rollers 4b and 5b and exposed to the erasing light, the radiation energy remaining on the stimulable phosphor portion 1B after the image read-out from the stimulable phosphor portion 1B has been performed is released from the stimulable phosphor portion 1B.

After the stimulable phosphor belt section 8 is moved to the right end of its movement range, the condition of the stimulable phosphor belt section 8 becomes as shown in FIG. 4C. In this condition, though the stimulable phosphor belt section 8 as a whole is present at the right end of its movement range, it is necessary for the stimulable phosphor portion 1A and the stimulable phosphor portion 1B to be moved further by the rotations of the rollers 4b and 5b. Therefore, the motor 41 continues to rotate the shaft 4a clockwise, the shaft 5b slips in contact with the side edge of the groove 42a, and the rollers 4b and 5b continue to rotate clockwise. In this manner, the stimulable phosphor portion 1B is moved to the position at which the stimulable phosphor portion 1A was disposed as shown in FIG. 4A, and the stimulable phosphor portion 1A is moved to the position at which the stimulable phosphor portion 1B was disposed as shown in FIG. 4A. The stimulable phosphor portion 1B disposed at the image recording section 10 in this manner has been erased over its overall surface, and is reused for the image recording.

On the other hand, a sheet housing magazine 63 capable housing therein a plurality of the recording sheets 3, on which the image reproduction has been performed is provided below the case 2. At the time the image reproduction on the recording sheet 3 supported on the supporting base 60 is finished, the suction cup 62 is moved to the position indicated by the solid line in FIG. 4C, and sucks up the recording sheet 3. Then the suction cup 62 is moved to the position indicated by the broken line in FIG. 4C, and transfers the recording sheet 3 to rollers 64 provided in the vicinity of the sheet housing magazine 63. The rollers 64 convey the recording sheet 3 into the sheet housing magazine 63. After a predetermined number of the recording sheets 3 on which the image reproduction has been carried out have been conveyed into the sheet housing magazine 63, a shutter 63a of the sheet housing magazine 63 is closed, and the sheet housing magazine 63 is taken out of the radiation image recording, read-out, and reproducing apparatus and sent to an automatic developing machine (not shown). The suction cup 62 then is returned to the position indicated by the solid line in FIG. 4A, and conveys a new recording sheet 3 from the sheet feed magazine 61 to the supporting base 60. Instead of providing the sheet housing magazine 63, a conveyance path for conveying the recording sheet 3 from the supporting base 60 may be provided, the automatic developing machine may be directly connected with the radiation image recording, read-out, and reproducing apparatus, and the recording sheet 3 on which the image reproduction has been performed may be sent directly to the automatic developing machine.

With the embodiment shown in FIG. 4A, as in the case of the aforesaid embodiments of the radiation image recording and read-out apparatus, the image recording can be performed while the image read-out is being performed, and recording of many radiation images can be performed efficiently. Also, with this embodiment wherein the recording light scanning section 50 is provided for movement together with the image read-out section 220 and the recording sheet 3 is scanned while the recording light scanning section 50 and the image read-out section 220 are being moved, a radiation image recording and read-out apparatus and a radiation image reproducing apparatus can be formed integrally with each other, and the image read-out and the image reproduction can be performed simultaneously.

Instead of using a single motor to move the stimulable phosphor belt section 8, the case 2, and the stimulable phosphor belt 1, the movement may be controlled by independent means. In this case, the holding unit 9 need not be provided. Also, the recording light scanning section 50 need not necessarily be constituted for reproducing the radiation image immediately after it is read out by the image read-out section 220. For example, the recording light scanning section 50 may be constituted for storing the electric image signals read out in the manner as mentioned above in a storage unit and reproducing a desired radiation image when necessary. Also, a single light source may be used in common for the image recording and the image read-out by splitting the light beam produced by the single light source into the recording light and the stimulating rays. As the recording sheet 3, instead of the ordinary wet development photographic material, a heat development photosensitive material, an instant photosensitive material, a heat sensitive recording material, or the like may be used.

What is claimed:

1. A radiation image recording and read-out apparatus comprising:
   (i) a stimulable phosphor belt section constituted by a stimulable phosphor belt, which is composed of an endless belt provided with a stimulable phosphor layer, and a pair of roller sections for supporting said stimulable phosphor belt therearound so as to define first and second surfaces, and for moving said stimulable phosphor belt therearound;
   (ii) an image recording section provided to face said first surface of said stimulable phosphor belt for exposing said first surface of said stimulable phosphor belt to radiation carrying an image to have a radiation image of an object stored on said stimulable phosphor layer;
   (iii) an image read-out section disposed to face said second surface of said stimulable phosphor belt and provided with a stimulating ray scanning means for scanning said stimulable phosphor layer carrying said radiation image stored thereon by stimulating rays which cause said stimulable phosphor layer to emit light in proportion to the stored radiation energy, and a photoelectric read-out means for obtaining electric image signals by reading out the light emitted by said stimulable phosphor layer scanned with the stimulating rays;
   (iv) an erasing section for releasing the radiation energy remaining on said stimulable phosphor layer prior to image recording on said stimulable phosphor layer after the radiation image has been read out therefrom at said image read-out section; and
   (v) a movement means for moving said second surface relative to said image read-out section at the time of the image read-out such that said first surface is held substantially stationary relative to said image recording section.

2. A radiation image according and read-out apparatus as defined in claim 1 wherein said movement means comprises means for moving said second surface and said image read-out section integrally with each other.

3. A radiation image recording and read-out apparatus as defined in claim 1 or 2 wherein each of said roller sections is composed of a shaft and a roller formed integrally with each other via a one-way clutch so that said roller is rotated together with said shaft at the time said shaft is rotated in one direction, and said roller is made free at the time said shaft is rotated reversely to said one direction.

4. A radiation image recording and read-out apparatus as defined in claim 1 or 2 wherein said stimulating rays are a laser beam.

5. A radiation image recording, read-out, and reproducing apparatus comprising:
   (i) a stimulable phosphor belt section constituted by a stimulable phosphor belt, which is composed of an endless belt provided with a stimulable phosphor layer, and a pair of roller sections for supporting said stimulable phosphor belt therearound so as to define first and second surfaces, and for moving said stimulable phosphor belt therearound;
   (ii) an image recording section provided to face said first surface of said stimulable phosphor belt for exposing said first surface of said stimulable phosphor belt to radiation carrying an image to have a radiation image of an object stored on said stimulable phosphor layer;
   (iii) an image read-out means disposed to face said second surface of said stimulable phosphor belt and provided with a stimulating ray scanning means for scanning said stimulable phosphor layer carrying said radiation image stored thereon by simulating rays which cause said stimulable phosphor layer to emit light in proportion to the stored radiation energy, and a photoelectric read-out means for obtaining electric image signals by reading out the light emitted by said stimulable phosphor layer scanned with the stimulating rays;
   (iv) a recording light scanning means for scanning a surface facing said second surface of said stimulable phosphor belt by recording light modulated in accordance with said electric image signals;
   (v) a movement means for moving said second surface, said image read-out means, and said recording light scanning means integrally with one another at the time of the image read-out so as to effect relative movement between said second surface and said image read-out means while holding said first surface substantially stationary relative to said image recording section;
   (vi) an erasing section for releasing the radiation energy remaining on said stimulable phosphor layer prior to image recording on said stimulable phosphor layer after the radiation image has been read-out therefrom by said image read-out means; and
   (vii) a recording sheet holding means for holding a recording sheet at a position scanned by said recording light at the time said recording light scanning means is moved by said movement means.

6. A radiation image recording, read-out, and reproducing apparatus as defined in claim 5 wherein each of said roller sections is composed of a shaft and a roller formed integrally with each other via a one-way clutch so that said roller is rotated together with said shaft at the time said shaft is rotated in one direction, and said roller is made free at the time said shaft is rotated reversely to said one direction.

7. A radiation image recording, read-out, and reproducing apparatus as defined in claim 5 wherein said stimulating rays is a laser beam.

8. A radiation image recording, read-out, and reproducing apparatus as defined in claim 5 or 7 wherein said recording light is a laser beam.

9. A radiation image recording and read-out apparatus according to claim 1, wherein said stimulable phosphor layer comprises two separate portions spatially disposed on said stimulable phosphor belt.

10. A radiation image recording and read-out apparatus according to claim 1, wherein said stimulable phosphor layer comprises a continuous layer disposed over said stimulable phosphor belt.

* * * * *